(12) United States Patent
Zeryck et al.

(10) Patent No.: US 6,832,379 B1
(45) Date of Patent: Dec. 14, 2004

(54) COMPUTER ARCHITECTURE UTILIZING LAYERED DEVICE DRIVERS

(75) Inventors: David Zeryck, Chelmsford, MA (US); Dave Harvey, Newton, MA (US); Jeffrey Lucovsky, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/375,331

(22) Filed: Aug. 17, 1999

(51) Int. Cl.⁷ .................................. G06F 9/00
(52) U.S. Cl. .............. 719/327; 719/321; 717/168
(58) Field of Search ................ 719/327, 321; 717/168; 709/321–327, 331, 221; 710/86, 41, 48, 59

(56) References Cited

U.S. PATENT DOCUMENTS

| | | | |
|---|---|---|---|
| 5,339,432 A | | 8/1994 | Crick .......................... 395/700 |
| 5,412,798 A | * | 5/1995 | Garney ........................ 709/321 |
| 5,432,941 A | | 7/1995 | Crick et al. .................. 395/700 |
| 5,608,651 A | | 3/1997 | Leavy et al. ................. 364/514 |
| 5,630,076 A | | 5/1997 | Saulpaugh et al. ......... 395/284 |
| 5,659,685 A | * | 8/1997 | Williams et al. ............ 709/220 |
| 5,732,282 A | | 3/1998 | Provino et al. ............. 395/830 |
| 5,761,411 A | | 6/1998 | Teague et al. ......... 395/184.01 |
| 5,781,797 A | * | 7/1998 | Crick et al. .................... 710/10 |
| 5,784,615 A | | 7/1998 | Lipe et al. ................... 395/681 |
| 5,802,364 A | | 9/1998 | Senator et al. .............. 395/681 |
| 5,809,329 A | * | 9/1998 | Lichtman et al. .............. 710/8 |
| 5,819,107 A | * | 10/1998 | Lichtman et al. .............. 710/8 |
| 6,032,217 A | | 2/2000 | Arnott ......................... 710/200 |
| 6,041,363 A | | 3/2000 | Schaffer ...................... 709/301 |
| 6,205,492 B1 | * | 3/2001 | Shaw et al. .................. 709/321 |
| 6,233,624 B1 | * | 5/2001 | Hyder et al. ................. 709/327 |
| 6,401,223 B1 | | 6/2002 | DePenning ................... 714/42 |
| RE38,134 E | | 6/2003 | Ross et al. .................... 710/20 |
| 6,694,317 B1 | | 2/2004 | Stakutis et al. .............. 707/10 |

OTHER PUBLICATIONS

Petrusha, Ron: "Inside the Windows 95 Registry", O'Reilly and Associates, Inc. 1996. pp. 35,38–39.*
Standish, Thomas: "Data Structures, Algorithms, and Software Principles", Addison Wesley, 1995. p. 36.*

* cited by examiner

*Primary Examiner*—Meng-Al T. An
*Assistant Examiner*—Phuong N. Hoang
(74) *Attorney, Agent, or Firm*—Bromberg & Sunstein LLP

(57) ABSTRACT

A computer storage architecture utilizing layered device drivers enables a user to create and install a device driver into a computer. The device driver is installed into the storage unit through a registration process. In order to permit the user to specify a device driver stack for the device driver and specify the relative position of the device driver within the device driver stack, a novel layered device driver registration system that is separate from a operating system device driver registration system is utilized. The layered device driver registration system enables the user to install one or more device drivers and to specify the placement of each device driver by relative to the other device drivers in various device driver stacks. The layered device driver registration system allows a device driver to be dynamically inserted into or removed from a particular device driver stack.

9 Claims, 19 Drawing Sheets

COMPUTER ARCHITECTURE UTILIZING LAYERED DEVICE DRIVERS

CROSS-REFERENCE TO RELATED APPLICATIONS

Application No. 09/375,860 entitled REMOTE MIRRORING SYSTEM, DEVICE, AND METHOD, filed in the names of Dennis Duprey and Jeffrey Lucovsky on even date herewith, now issued as U.S. Pat. No. 6,671,705; and Application No. 09/376,173 entitled SYSTEM, DEVICE, AND METHOD FOR INTERPROCESSOR COMMUNICATION IN A COMPUTER SYSTEM, filed in the names of Alan L. Taylor, Jeffrey Lucovsky, and Karl Owen on even date herewith.

FIELD OF THE INVENTION

The present invention relates generally to computer systems, and more particularly to a computer architecture utilizing layered device drivers.

BACKGROUND OF THE INVENTION

A typical computer includes various physical and logical devices. Each device is typically supported through a device driver. The device driver defines the device (in the case of a logical device), and allows the other components in the computer to utilize the device.

Very often, a number of device drivers are used in combination in a stack configuration. When organized in a stack configuration, a particular device driver consumes services from the device driver below it in the stack and exports services to the device driver above it in the stack. For convenience, each device driver in a device driver stack is referred to as a layered device driver (LDD). Each LDD emulates a device. A LDD "exports" a device to the LDD above it in the device driver stack and "consumes" the device that is exported by the LDD below it in the device driver stack. A LDD is "bound" to the LDD below it in the device driver stack.

The U.S. Pat. No. 5,802,364 entitled MET ADEVICE DRIVER RENAME/EXCHANGE TECHNIQUE FOR A COMPUTER SYSTEM INCORPORATING A PLURALITY OF INDEPENDENT DEVICE DRIVERS, issued on Sep. 1, 1998 in the names of Steven T. Senator, Dale R. Passmore, and Robert S. Gittins, which is hereby incorporated by reference in its entirety, describes a LDD architecture for use in a storage device. This patent addresses altering a prior-established driver hierarchy, and describes a LDD architecture in which each LDD is able to operate independently of the other LDDs without knowledge of the private data structures of any of the other LDDs.

LDDs are installed into the computer through a registration process. Briefly, the operating system includes a device driver registration system that enables a LDD to be initialized and installed into the operating system. The user can specify the relative position of each LDD within the device driver stack.

For example, the Windows NT operating system includes an operating system device driver registration system. Specifically, the Windows NT operating system maintains a list of device drivers and their corresponding parameters in the System\CurrentControlSet\Services file. Using the information in the System\CurrentControlSet\Services file, the Windows NT operating system loads the device drivers into the operating system in a specified order. Such loading provides for orderly initialization of the device drivers.

One problem with the operating system device driver registration system is that it does not support multiple device driver stacks, which are necessary or desirable in some computer applications. Thus, the operating system device driver registration system does not allow the user to specify a particular device driver stack and a relative position in the device driver stack for each LDD.

Thus, there is a need for a layered device driver registration system that allows the user to specify a particular device driver stack and a relative position in the device driver stack for each LDD is needed, and also allows a layered device driver to be dynamically inserted into or removed from a particular device driver stack.

SUMMARY OF THE INVENTION

In accordance with one aspect of the present invention, a layered device driver registration system is used in conjunction with an operating system device driver registration system to enable a user to associate a device driver with one of a number of device driver stacks and to configure the relative position of the device driver within the device driver stack. The layered device driver registration system includes a driver list and a driver order list. In order to install a device driver, the device driver is added to the driver list, and the relative position of the device driver is indicated within the driver order list.

In accordance with another aspect of the invention, a layered device driver is inserted into a device driver stack between an upper device driver and a lower device driver by suspending input/output operations for the device driver stack, unbinding the upper device driver from the lower device driver, binding the new device driver to the lower device driver, binding the upper device driver to the new device driver, and restarting input/output operations for the device driver stack.

In accordance with yet another aspect of the invention, a layered device driver is removed from a device driver stack, and specifically from between an upper device driver and a lower device driver, by suspending input/output operations for the device driver stack, unbinding the upper device driver from the unwanted device driver, unbinding the unwanted device driver from the lower device driver, binding the upper device driver to the lower device driver, and restarting input/output operations for the device driver stack.

DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention utilizes a layered device driver (LDD) registration system in conjunction with the operating system device driver registration system in order to enable the user to install one or more LDDs and to specify the placement of each LDD relative to the other LDDs in various device driver stacks. The LDD registration system also allows a LDD to be dynamically inserted into or removed from a particular device driver stack.

The LDD registration system keeps track of the LDDs that are installed and the relationships between the LDDs using two lists. Specifically, a Drivers list identifies the LDDs that are installed, and a DriverOrder list specifies the relative position of the LDDs.

Figure 1:
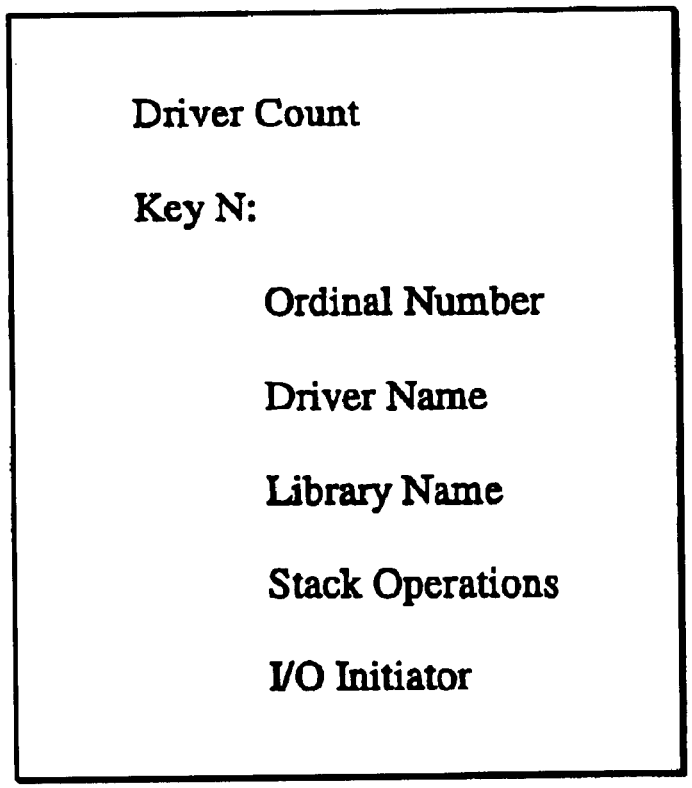
FIG. 1 shows the types of information contained in an exemplary drivers list in accordance with an embodiment of the present invention.
Figure 2:
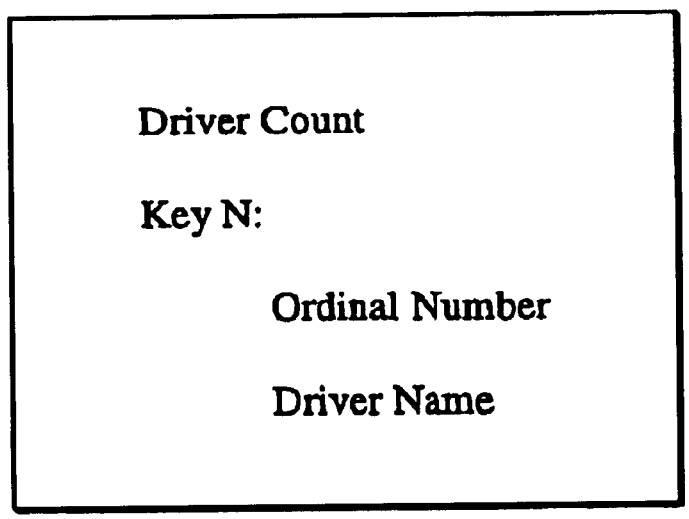
FIG. 2 shows the types of information contained in an exemplary driver order list in accordance with an embodiment of the present invention.

The Drivers list includes a DriverCount indicating the number of LDDs in the list, and also includes a key for each LDD. The key includes an ordinal number, a driver name, a library name, a stack operations parameter, and an I/O initiator parameter. The ordinal number indicates the driver number within the Drivers list (not the relative position of the LDD within a device driver stack). The driver name specifies the LDD name that is used by the LDD registration system to identify the LDD. The library name specifies the name of an administrative library that is associated with the LDD. The stack operations parameter identifies certain LDD administrative operations that would alter the global mapping of devices in the device driver stack. The I/O initiator parameter indicates whether the LDD initiates I/O, in which case the driver must be instructed to quiesce I/O for the device driver stack when changes are made to that device driver stack. FIG. 1 shows an exemplary Drivers list including a DriverCount and a key.

In order to utilize a particular device, the corresponding LDD is installed at a specified relative position in a specified device driver stack, specifically between an upper LDD and a lower LDD already in the device driver stack. Installing the new LDD into the device driver stack involves suspending 110 operations for the device driver stack, unbinding the upper LDD from the lower LDD, binding the new LDD to the lower LDD, binding the upper LDD to the new LDD, and restarting I/O operations for the device driver stack.

Figure 3A:
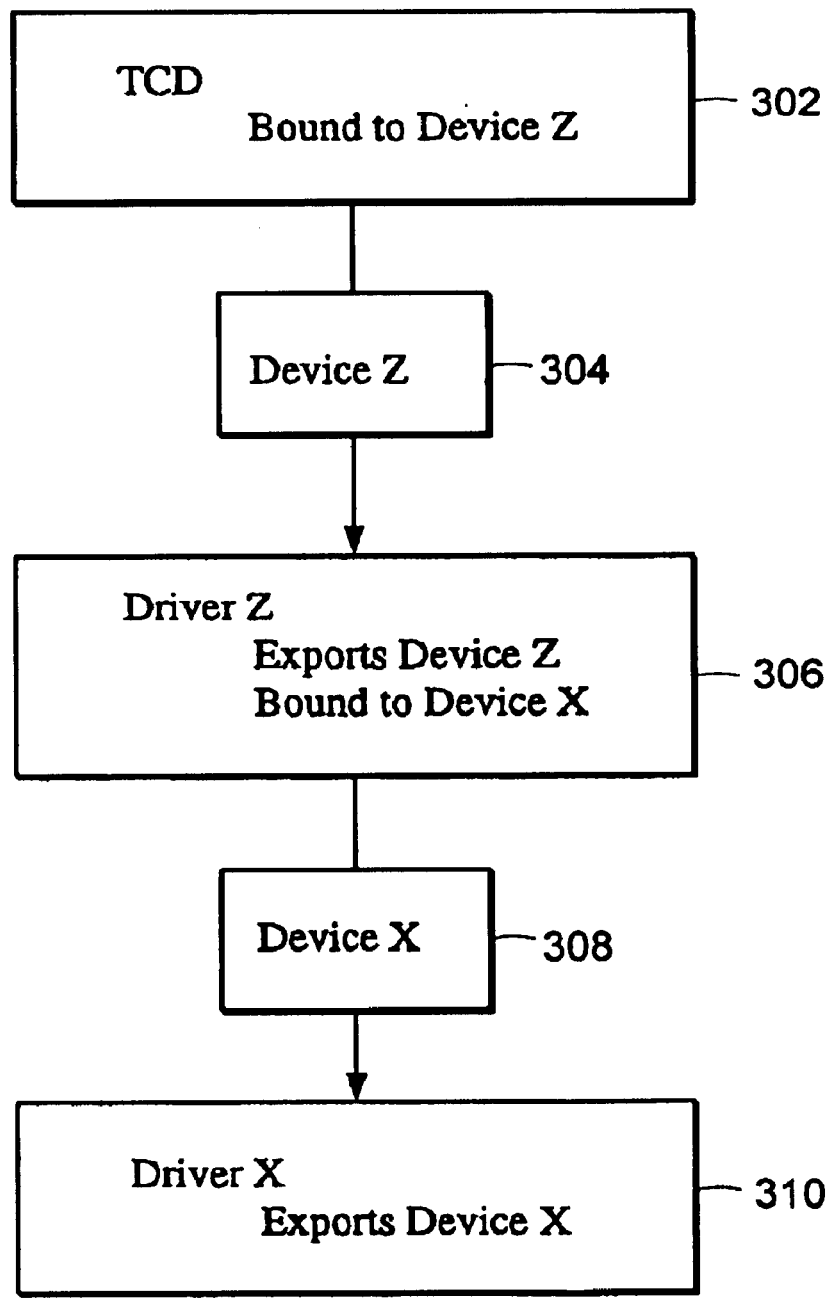
FIG. 3A is a block diagram showing an exemplary device driver stack in accordance with an embodiment of the present invention.

FIG. 3A shows an exemplary device driver stack including three LDDs, namely TCD (302), Driver Z (306), and Driver X (310). Driver X (310) exports Device X (308). Driver Z (306) is bound to Device X (308), and exports Device Z (304). TCD (302) consumes Device Z (304).

In order to insert a Device Y into the device driver stack between Device Z (304) and Device X (308), a Driver Y is inserted into the device driver stack between Driver Z (306) and Driver X (310). First, I/O operations are suspended for the device driver stack. Then, Driver Z (306) is unbound from Device X (308). Next, Driver Y is bound to Device X (308), and exports Device Y. Finally, Driver Z (306) is bound to Device Y, and I/O operations are restarted for the device driver stack.

Figure 3B:
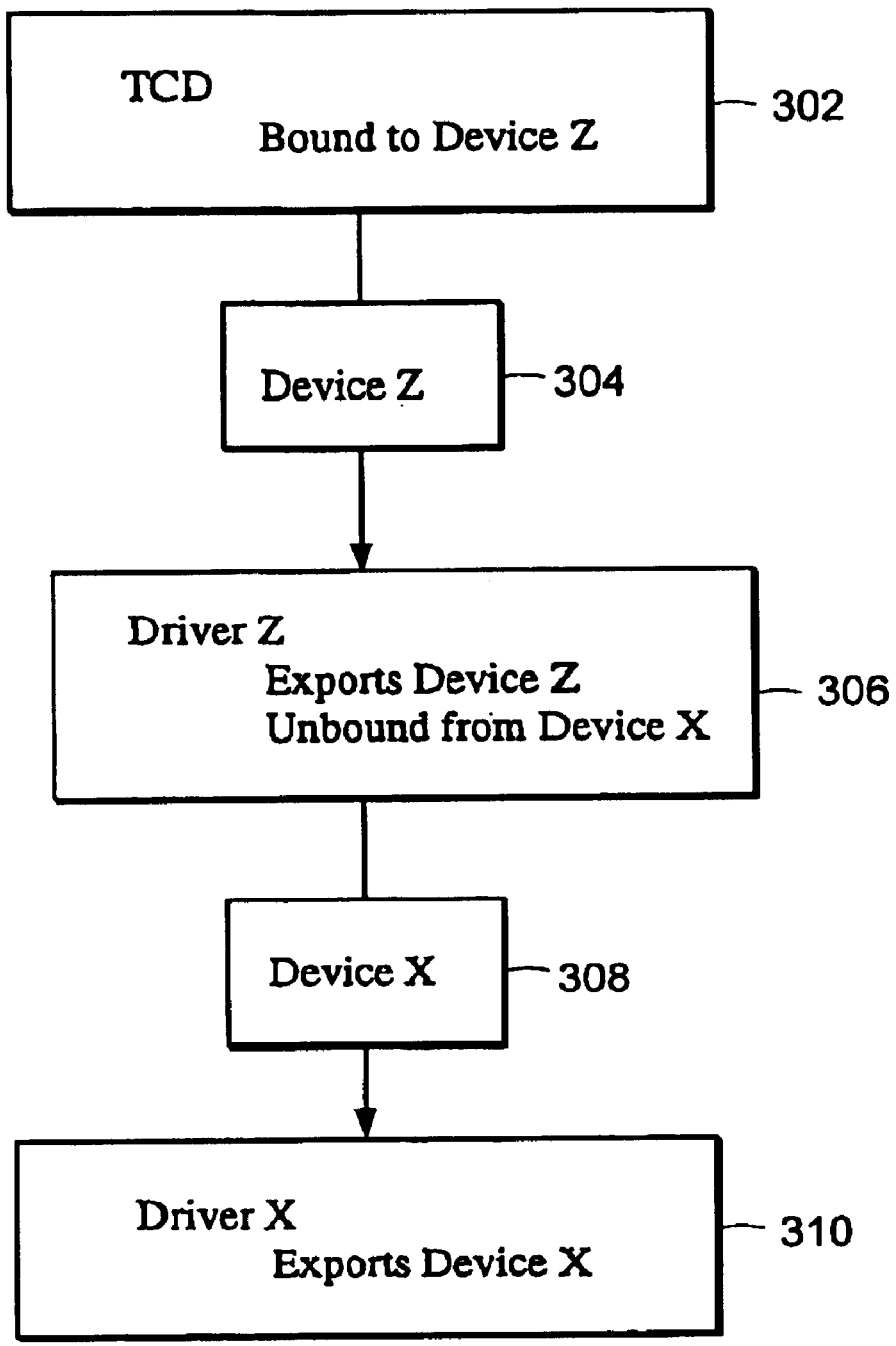
FIG. 3B is a block diagram showing an exemplary device driver stack in which an upper device driver is unbound from a lower device driver for inserting a device driver in the device driver stack in accordance with an embodiment of the present invention.

FIG. 3B shows the exemplary device driver stack in which Driver Z (306) is unbound from Device X (308).

Figure 3C:
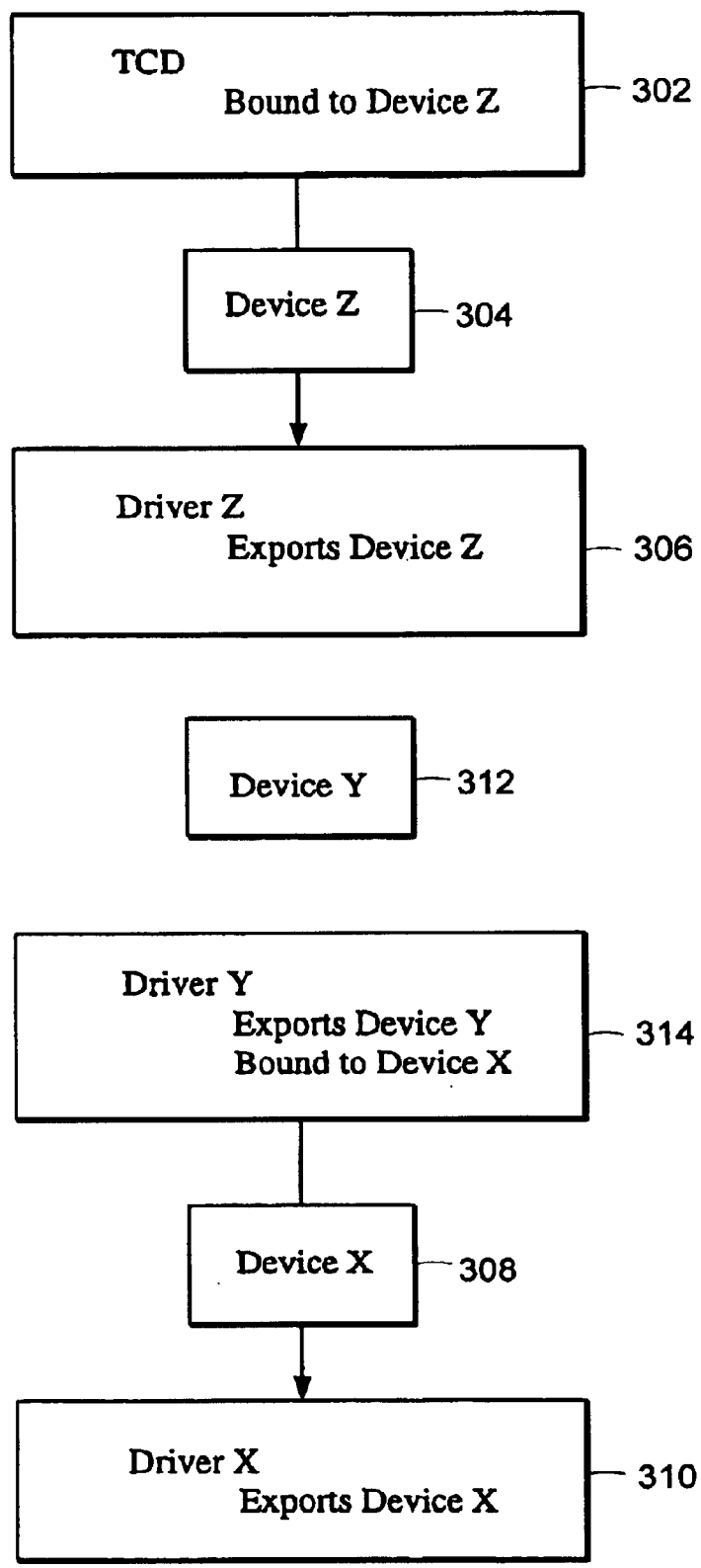
FIG. 3C is a block diagram showing an exemplary device driver stack in which the device driver is bound to the lower device driver in accordance with an embodiment of the present invention.

FIG. 3C shows the exemplary device driver stack in which Driver Y (314) is bound to Device X (308) and exports Device Y (312).

Figure 4:
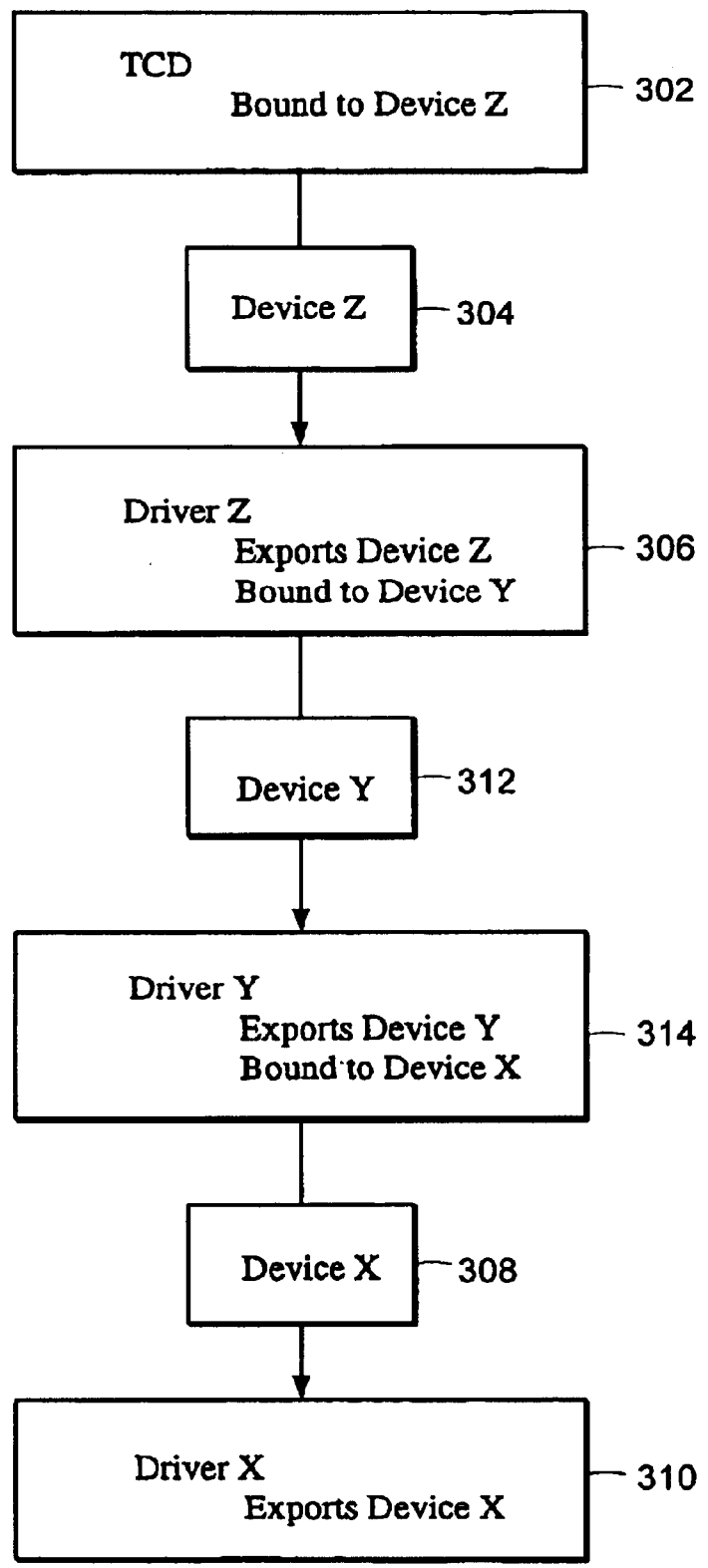
FIG. 4 is a block diagram showing an exemplary device driver stack in which the upper device driver is bound to the device driver in accordance with an embodiment of the present invention.

FIG. 4 shows the exemplary device driver stack in which Driver Z (306) is bound to Device Y (312), completing the installation of the Driver Y (314) into the device driver stack.

Figure 5:
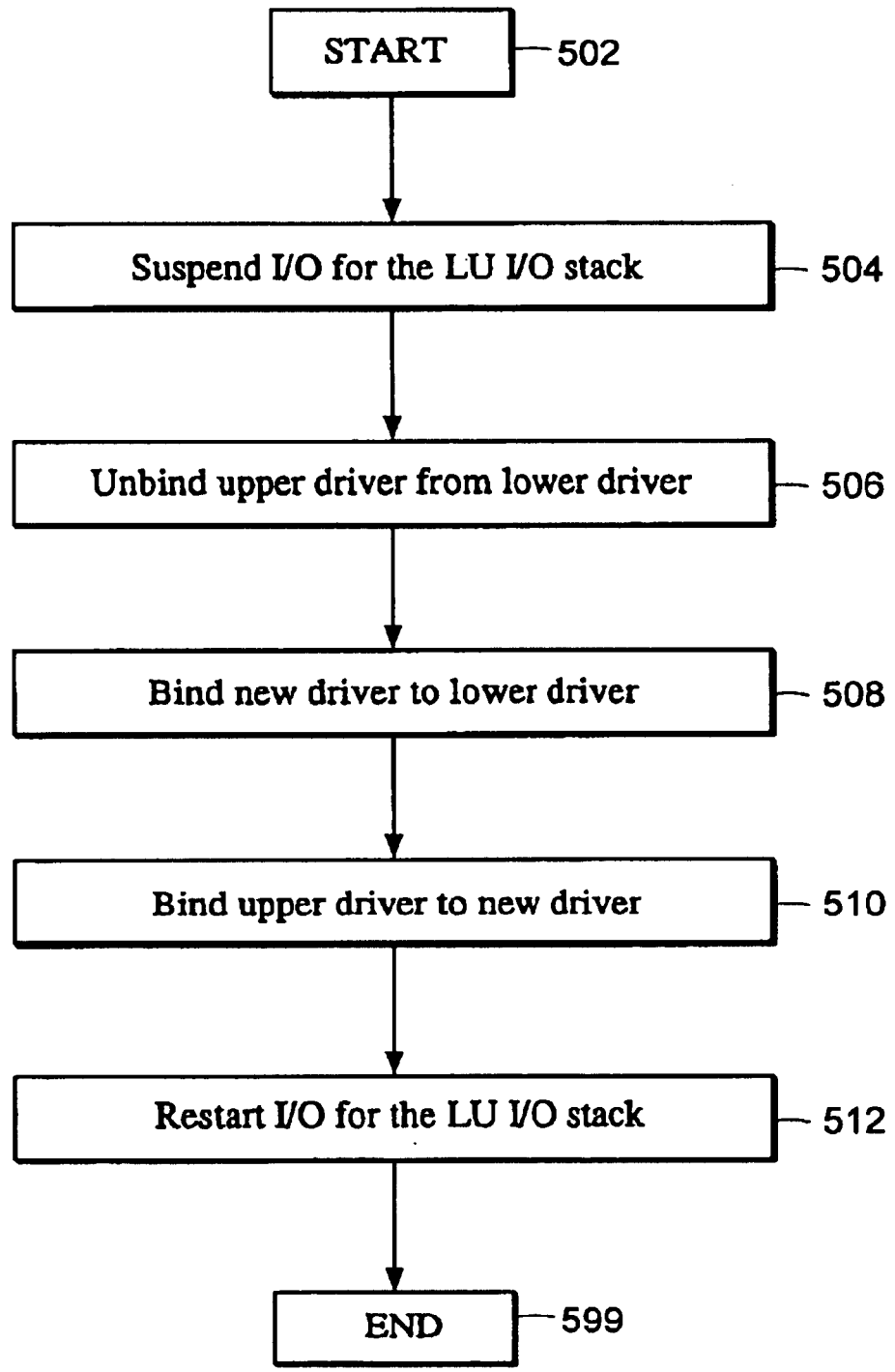
FIG. 5 is a logic flow diagram showing exemplary logic for inserting a device driver into the device driver stack in accordance with an embodiment of the present invention.

FIG. 5 is a logic flow diagram showing exemplary logic for inserting a device into a device driver stack. Beginning in step 502, the logic first suspends I/O operations for the LU I/O stack, in step 504. The logic then unbinds the upper LDD from the lower LDD, in step 506, binds the new LDD to the lower LDD, in step 508, and binds the upper LDD to the new LDD, in step 510. Finally, the logic restarts I/O operations for the device driver stack, in step 512, and terminates in step 599.

Figure 6A:
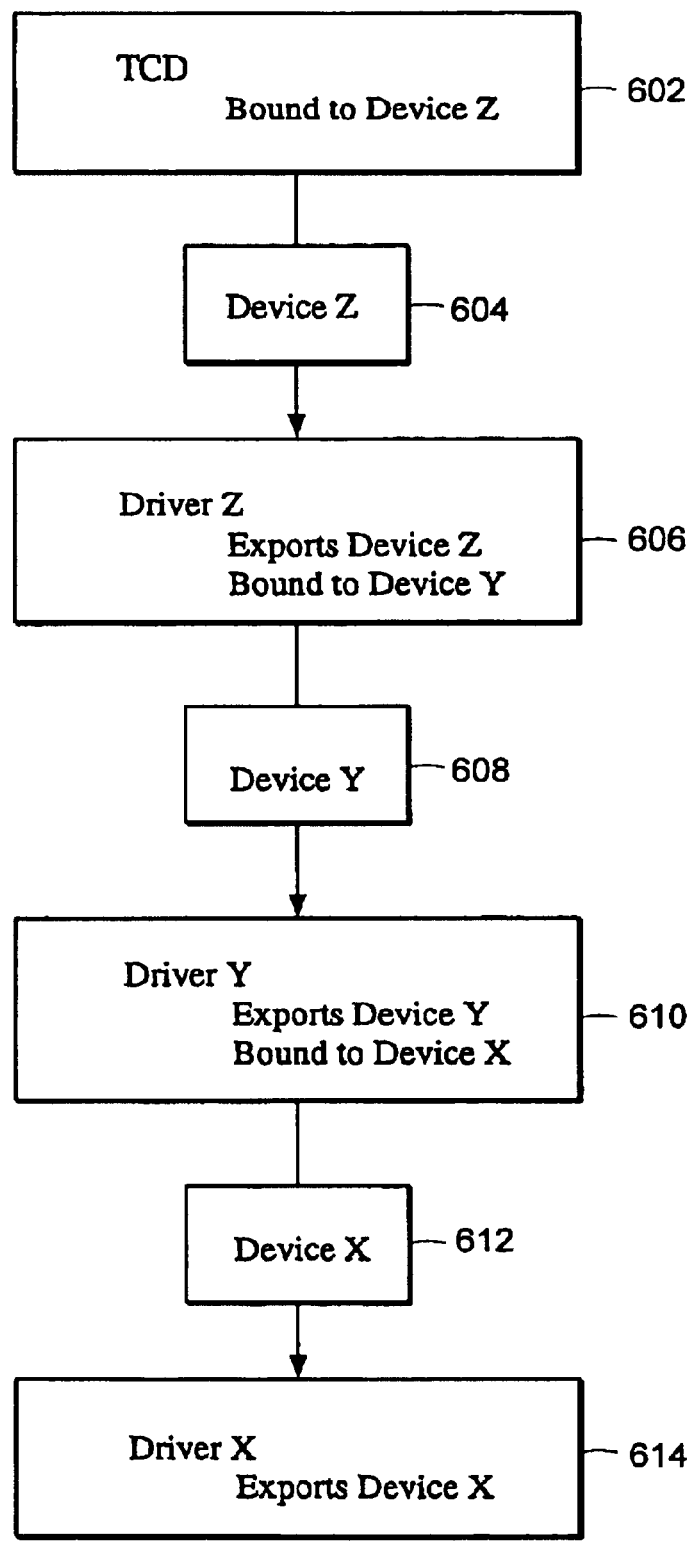
FIG. 6A is a block diagram showing an exemplary device driver stack including a device driver in accordance with an embodiment of the present invention.

In order to stop using a particular device, the corresponding LDD may be removed from the device driver stack, specifically from between an upper LDD and a lower LDD already in the device driver stack. Removing the unwanted LDD from the device driver stack involves suspending I/O operations for the device driver stack, unbinding the upper LDD from the unwanted LDD, unbinding the unwanted LDD from the lower LDD, binding the upper LDD to the lower LDD, and restarting I/O operations for the device driver stack FIG. 6A shows an exemplary device driver stack including four LDDs, namely TCD (602), Driver Z (606), Driver Y (610) and Driver X (614). Driver X (614) exports Device X (612). Driver Y (610) is bound to Device X (612), and exports Device Y (608). Driver Z (606) is bound to Device Y (608), and exports Device Z (604). TCD (602) consumes Device Z (604).

In order to remove Device Y (608) from the device driver stack, I/O operations are suspended for the device driver stack. Then, Driver Z (606) is unbound from Device Y (608), and Driver Y (610) is unbound from Device X (612). Finally, Driver Z (606) is bound to Device X (612), and I/O operations are restarted for the device driver stack.

Figure 6B:
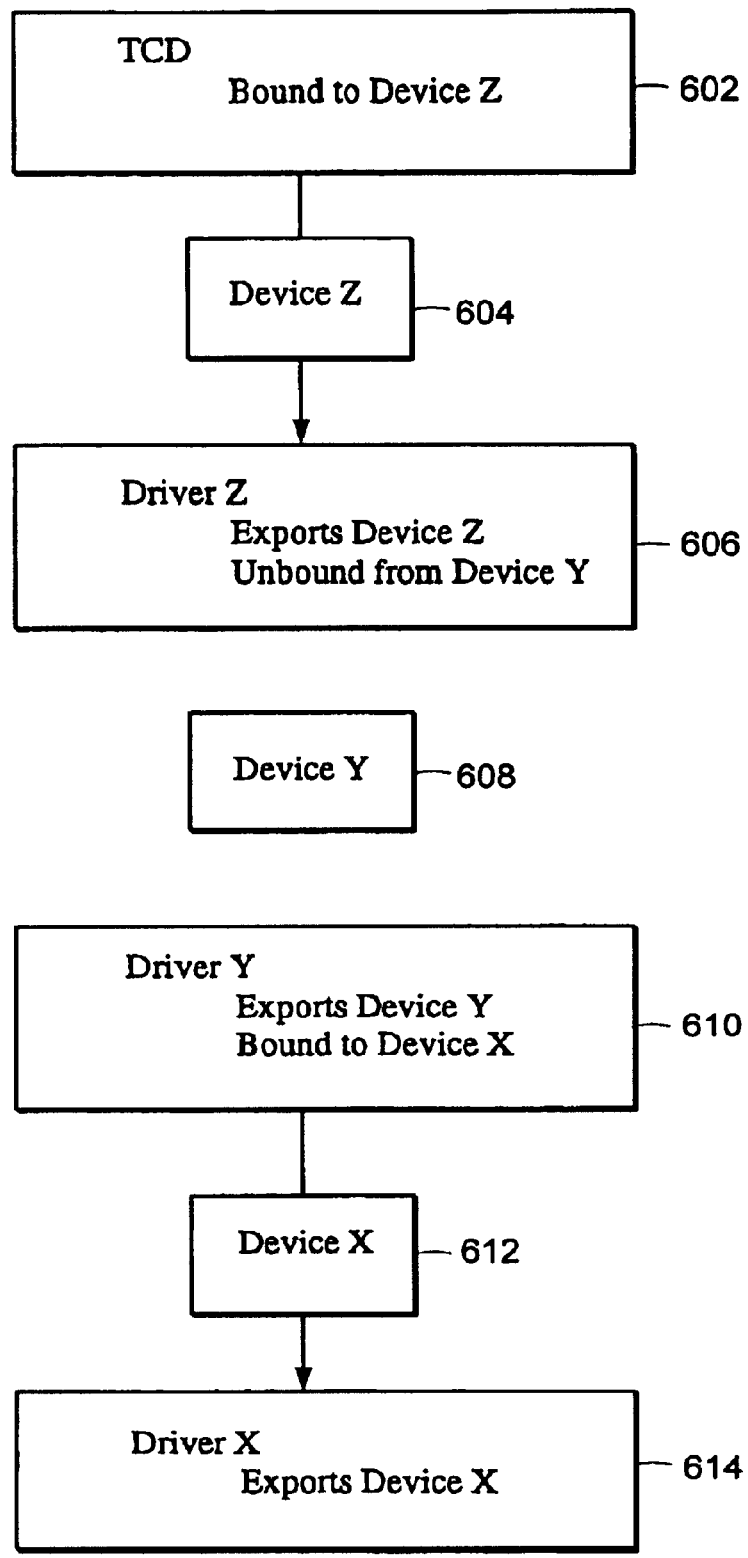
FIG. 6B is a block diagram showing an exemplary device driver stack in which an upper device driver is unbound from the device driver for removing the device driver from the device driver stack in accordance with an embodiment of the present invention.

FIG. 6B shows the exemplary device driver stack in which Driver Z (606) is unbound from Device Y (608).

Figure 6C:
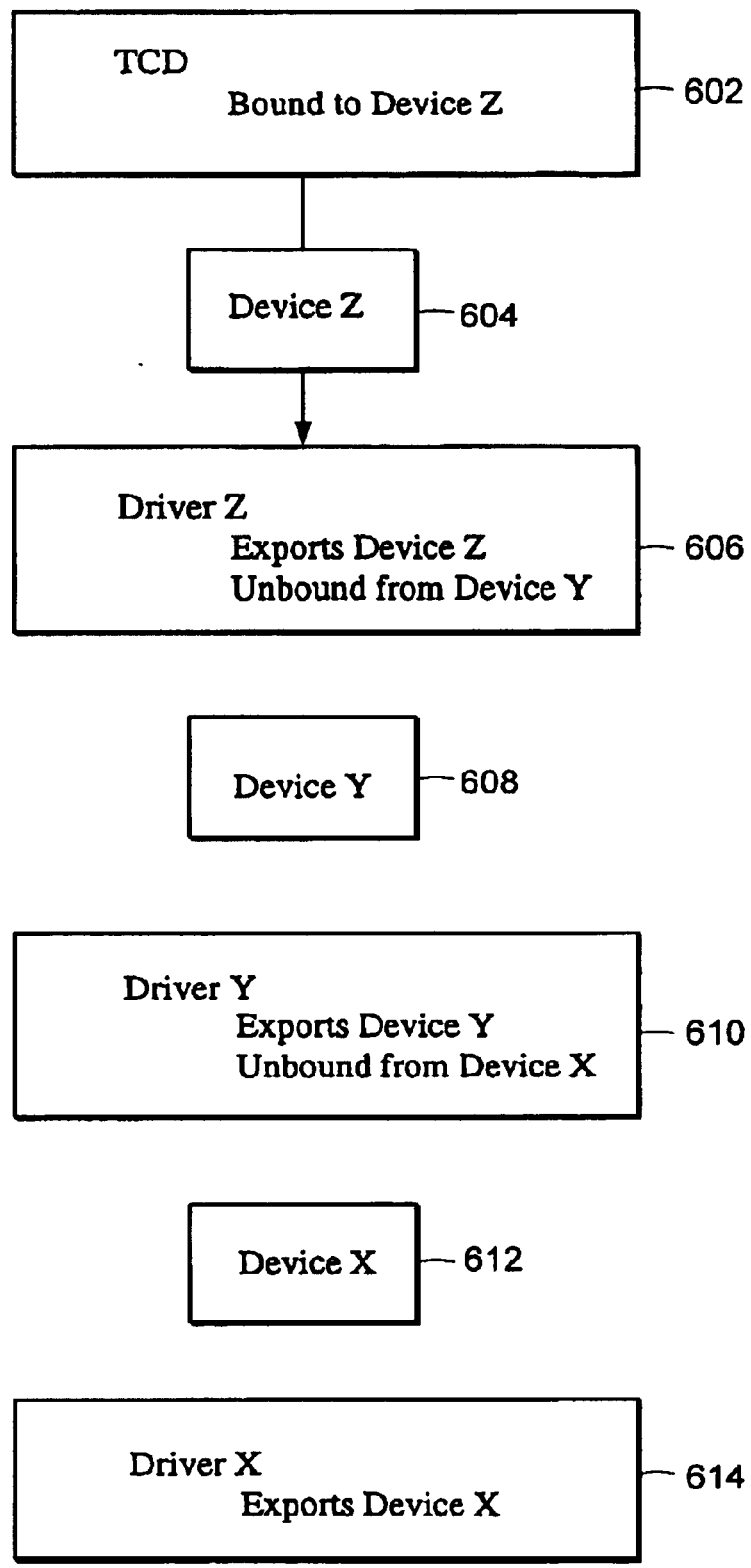
FIG. 6C is a block diagram showing an exemplary device driver stack in which the device driver is unbound from a lower device driver for removing the device driver from the device driver stack in accordance with an embodiment of the present invention.

FIG. 6C shows the exemplary device driver stack in which Driver Y (610) is unbound from Device X (612).

Figure 7:
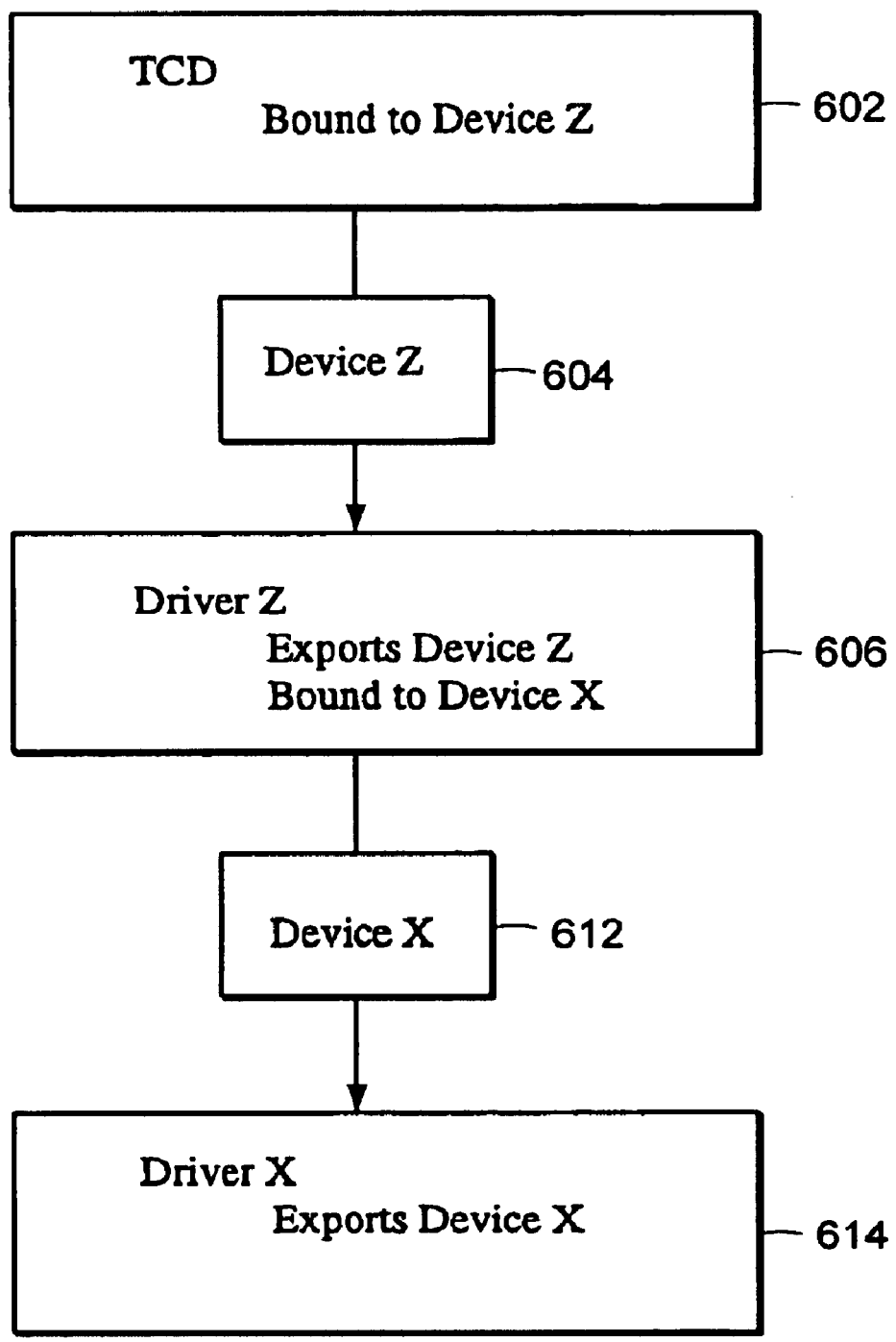
FIG. 7 is a block diagram showing an exemplary device driver stack in which the upper device driver is bound to the lower device driver in accordance with an embodiment of the present invention.

FIG. 7 shows the exemplary device driver stack in which Driver Z (606) is bound to Device X (612), thereby eliminating the Driver Y (610) from the device driver stack.

Figure 8:
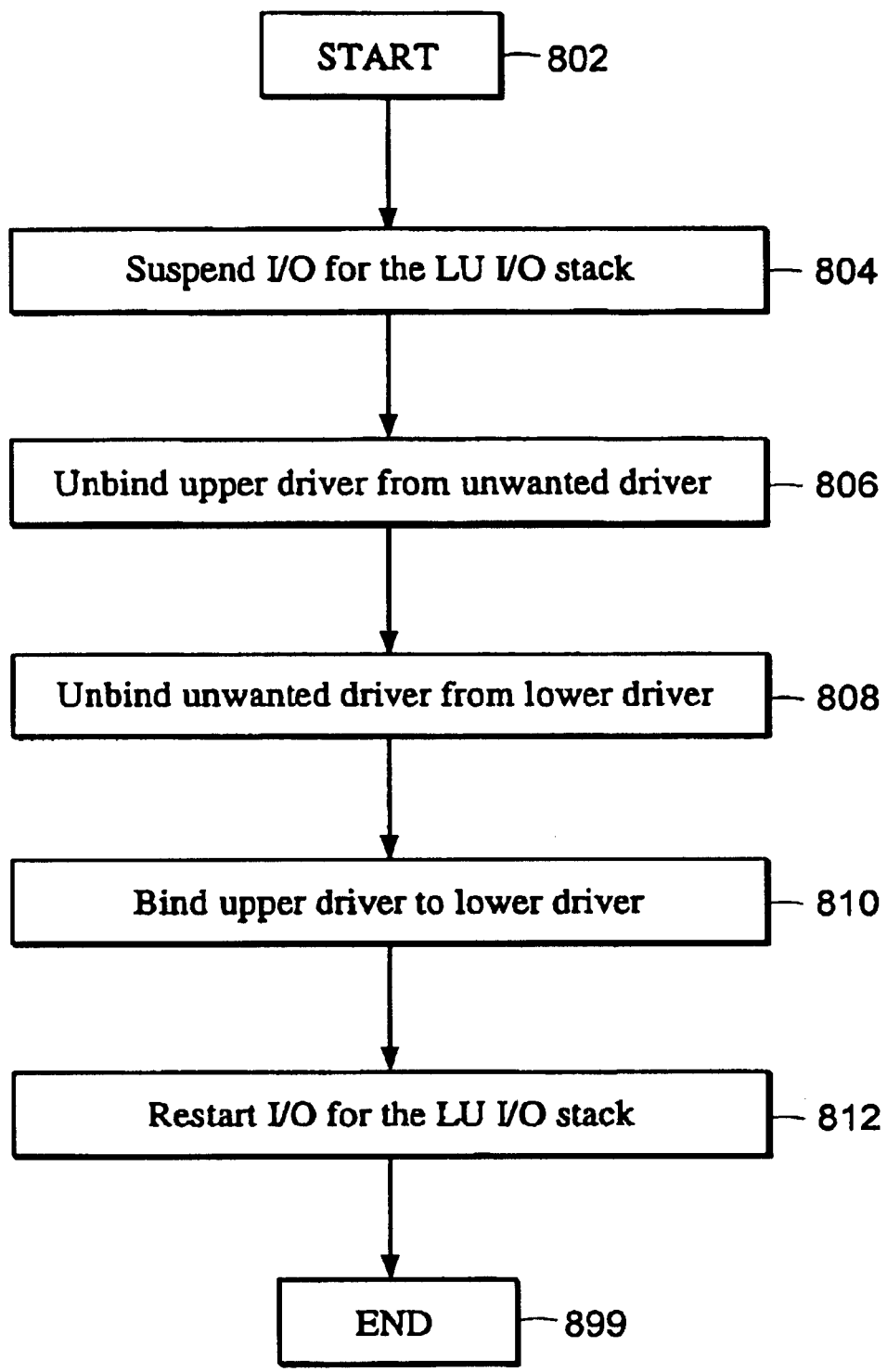
FIG. 8 is a logic flow diagram showing exemplary logic for removing a device driver from the device driver stack.

FIG. 8 is a logic flow diagram showing exemplary logic for removing a device from a device driver stack. Beginning in step 802, the logic first suspends I/O operations for the device driver stack, in step 804. The logic then unbinds the upper LDD from the unwanted LDD, in step 806, unbinds the unwanted LDD from the lower LDD, in step 808, and binds the upper LDD to the lower LDD, in step 810. Finally, the logic restarts I/O operations for the device driver stack, in step 812, and terminates in step 899.

In a preferred embodiment of the present invention, the LDD registration system is used for installing device drivers in a storage unit within a computer storage system. In a common computer system architecture, a host computer is coupled to a computer storage system that provides non-volatile storage for the host computer. The computer storage system includes, among other things, a number of interconnected storage units. Each storage unit includes a number of physical or logical storage media (for example, a disk array). For convenience, a group of one or more physical disks that are logically connected to form a single virtual disk is referred to hereinafter as a "Logical Unit" (LU). Data from the host computer is stored in the computer storage system, and specifically in the various storage units within the computer storage system.

The computer storage system preferably includes redundant systems in order to ensure data integrity and availability. Specifically, each storage unit includes redundant subsystems such as multiple storage processors and multiple disks in order to ensure continued operation in the case of a subsystem failure, and the various storage units in the computer storage system interoperate to ensure continued operation in the case of a complete storage unit failure.

In addition to ensuring continued operation during failures, the interoperation of the various storage units in the computer storage system together with the redundant subsystems within each storage unit enable the various storage units in the computer storage system to provide many advanced functions. For example, the various storage units in the computer storage system can interoperate to maintain redundant copies of information at geographically disparate locations, and the various storage units in the computer storage system can also interoperate to perform "load balancing" across the various storage units in the computer storage system. A remote mirroring function is described in the related patent No. 6,671,705 entitled REMOTE MIRRORING SYSTEM, DEVICE, AND METHOD, which was incorporated by reference above. Such interoperation requires special communications between the various storage units in the computer storage system, and more particularly between storage processors running in the various storage units.

Figure 9:
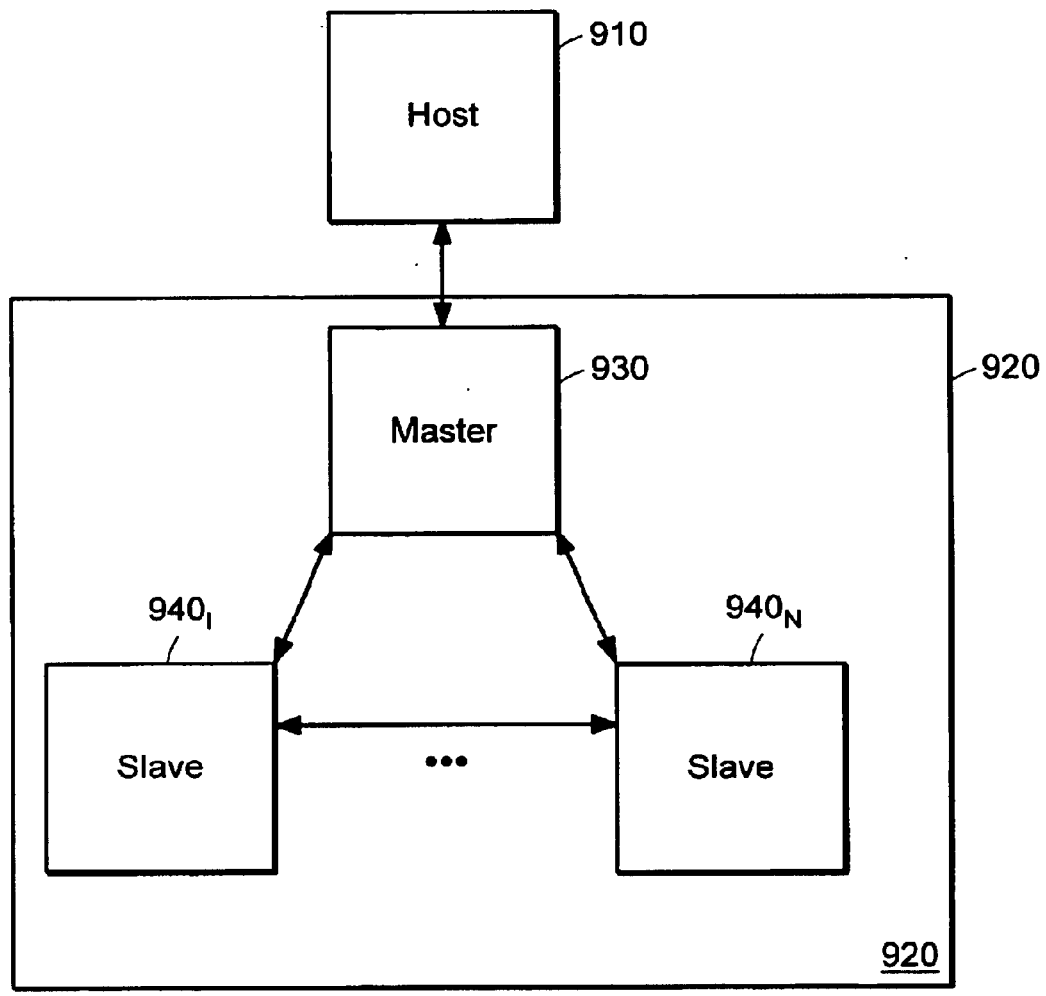
FIG. 9 is a block diagram showing an exemplary computer storage system in accordance with an embodiment of the present invention.

FIG. 9 shows an exemplary computer system 900 in accordance with an embodiment of the present invention. The exemplary computer system 900 includes a host 910 coupled to a computer storage system 920. The computer storage system 920 includes a master storage unit 930 and a number of slave storage units $940_1$ through $940_N$. The host 910 is coupled to the master storage unit 930. Certain storage functions, such as remote mirroring, requires each storage unit in the computer storage system 900 to maintain a communication link to all of the other storage units in the computer storage system 900, such that each storage unit is capable of communicating with all of the other storage units in the computer storage system 900.

Figure 10:
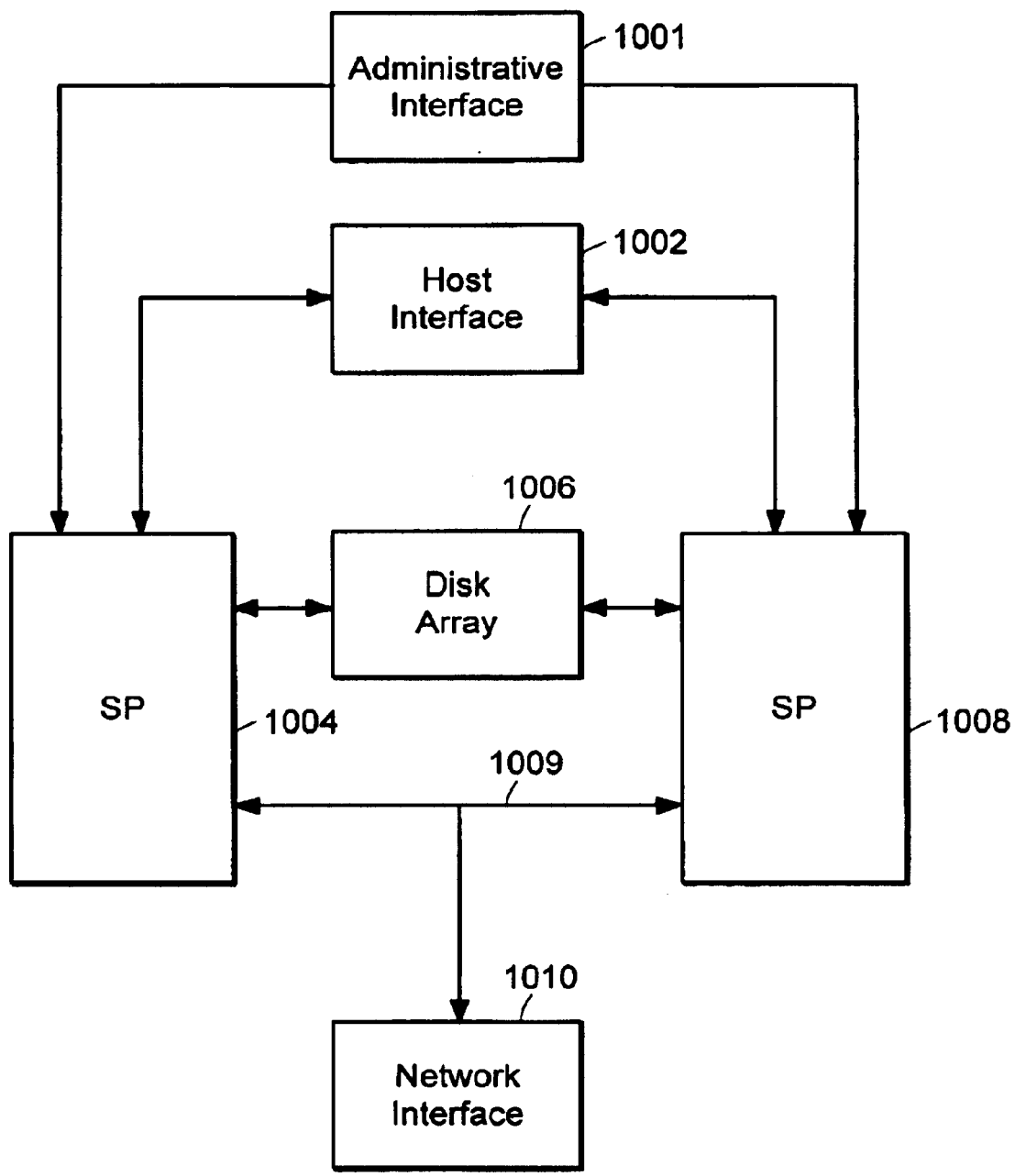
FIG. 10 is a block diagram showing an exemplary storage unit in accordance with an embodiment of the present invention.

In a preferred embodiment of the present invention, each of the storage units in the computer storage system, such as the master storage unit 930 and the slave storage units $940_1$ through $940_N$ in the computer storage system 920, is a fault-tolerant RAID (redundant array of independent disks) storage unit with redundant management and storage capabilities. As shown in FIG. 10, a preferred storage unit 1000 includes an Administrative Interface 1001, at least one Host Interface 1002, at least a first Storage Processor (SP) 1004 and an optional second SP 1008, a number of disks arranged as a Disk Array 1006, and a Network Interface 1010. The Administrative Interface 1001 is preferably an Ethernet interface through which the storage unit 1000 is managed and controlled. The Host 910 interfaces with the storage unit 1000 through the Host Interface 1002, which preferably emulates a SCSI interface. The Host Interface 1002 is coupled to the SP 1004 and to the optional SP 1008, such that the Host 910 can communicate with both the SP 1004 and the optional SP 1008. The SP 1004 and the optional SP 1008 are interconnected through an interface 1009, which is preferably a FibreChannel interface. The SP 1004 and the optional SP 1008 are also coupled to the Network Interface 1010 via the interface 1009, which enables each SP (1004, 1008) to communicate with SPs in other storage units within the computer storage system 920. The SPs that are interconnected via the interface 1009 communicate, for example, using a Message Passing Service as described in the related patent application entitled SYSTEM, DEVICE, AND METHOD FOR INTERPROCESSOR COMMUNICATION IN A COMPUTER SYSTEM, which was incorporated by reference above.

A preferred SP (1004, 1008) is based upon a commercially available single or multiple processor hardware platform that runs an operating system, such as the Windows NT operating system. Both SPs (1004, 1008) run essentially the same software, although the software can differ between the two SPs, for example, due to a software upgrade of one but not the other SP. Therefore, each SP (1004, 1008) is capable of providing full management functions for the storage unit.

The SP software requires each LU to be owned and accessed through one and only one SP at a time. This notion of LU ownership is referred to as "assignment." The SP software allows each LU in a LU Array Set to be "assigned" to a different SP. During normal operation of the storage unit, both SPs process requests and perform various management functions in order to provide redundancy for the storage unit. If one of the SPs fails, the other SP takes over management of the LUs for the failed SP. For convenience, the SP that is primarily responsible for managing a particular group of LUs is referred to hereinafter as the "primary" SP, while other SP is referred to hereinafter as the "secondary" SP. For purposes of the following discussion, and with reference again to FIG. 10, the SP 1004 will be referred to as the "primary" SP, and the SP 1008 will be referred to as the "secondary" SP.

Figure 11:
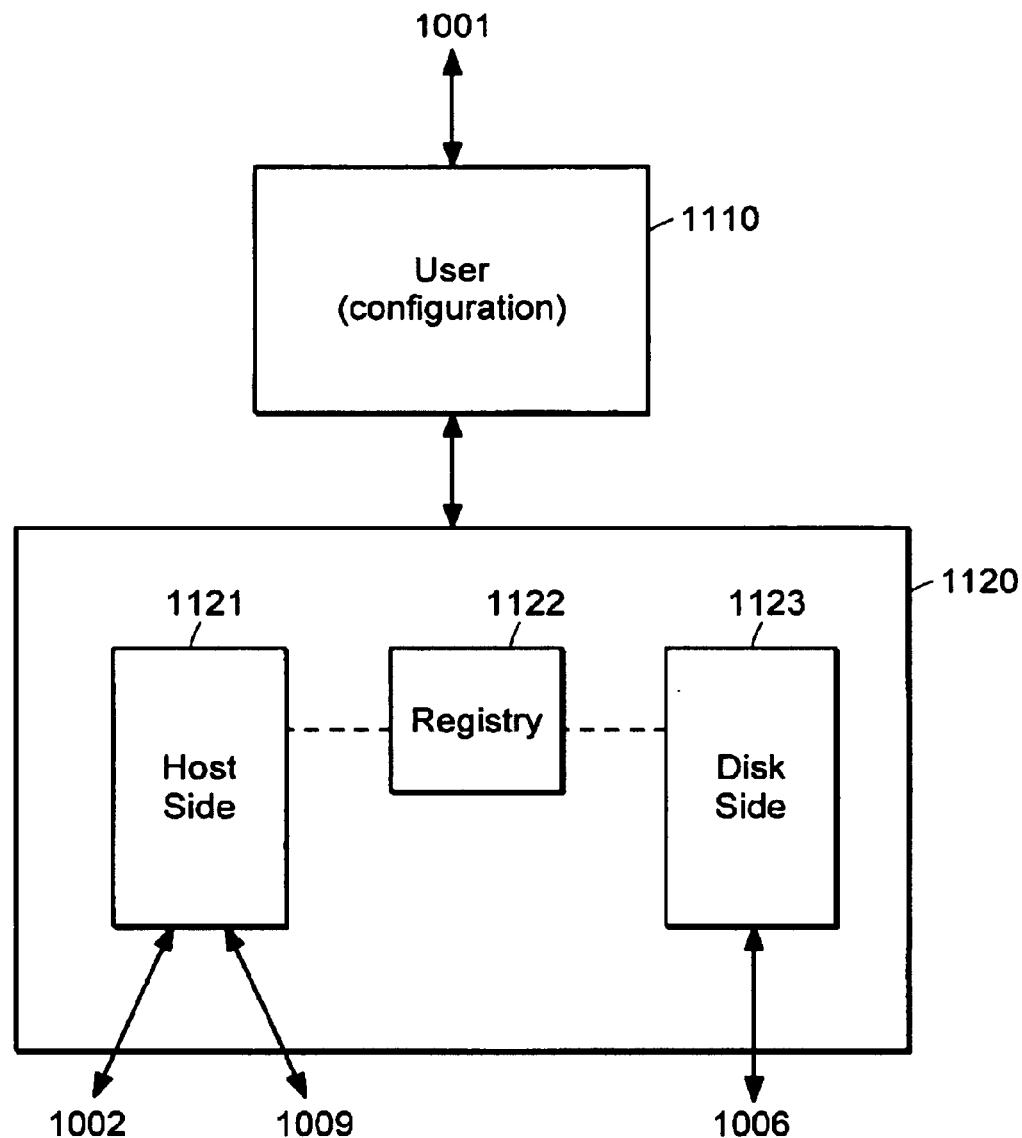
FIG. 11 is a block diagram showing the overall software architecture of exemplary storage processor software in accordance with an embodiment of the present invention.

FIG. 11 is a block diagram showing the general architecture of the SP software 1100. As shown in FIG. 11, the SP software is divided into two general categories, specifically User (Configuration) software 1110 and Kernel software 1120. The User (Configuration) software 1110 includes, among other things, the management protocol stack (TCP/IP) and all user-space software. The Kernel software 1120 is divided into two general areas, specifically Host-Side software 1121 and Disk-Side software 1123. The Host-Side software 1121 emulates a SCSI interface for communication with the Host 910 via the Host Interface 1002. The Disk-Side software 1123 manages the Disk Array 1006 and includes, among other things, software for coordinating information storage within and among the various storage units in the computer storage system.

The SP software utilizes layered device drivers to allow software functions to be dynamically activated or inactivated, specifically by adding or removing software drivers from a device driver stack, respectively. The layered device drivers are managed using both operating system services as well as the LDD registration system. Therefore, the Kernel software 1120 preferably includes, among other things, a Registry 1122 for registering device drivers with the operating system.

Figure 12:
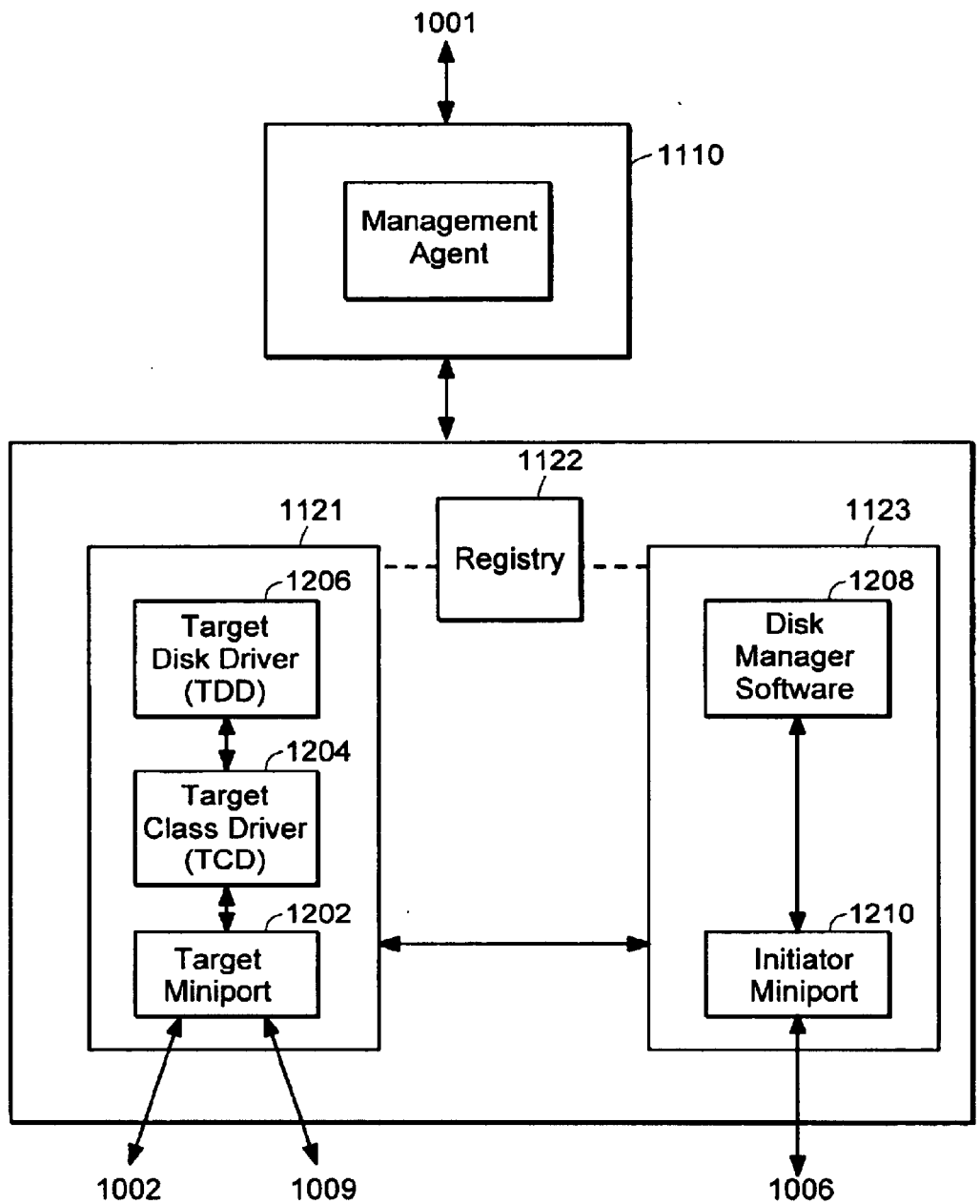
FIG. 12 is a block diagram showing a number of relevant components of a storage processor in accordance with an embodiment of the present invention.

FIG. 12 shows the SP software architecture in greater detail. As shown in FIG. 12, the Host-Side software 1121 includes a number of components, including a Target Miniport 1202, a Target Class Driver (TCD) 1204, and a Target Disk Driver (TDD) 1206. The Target Miniport 1202 emulates a SCSI interface for the Host Interface 1002 as well as the FibreChannel interface 1009 for inter-SP communication. The Disk-Side software 1123 includes a number of components, including the disk management software 1208 and an Initiator Miniport 1210. The Initiator Miniport 1210 provides an interface to the Disk Array 1006. The User (Configuration) software 1110 also includes a number of components, including a Management Agent 1214 for interfacing to a manager (not shown).

Figure 13:
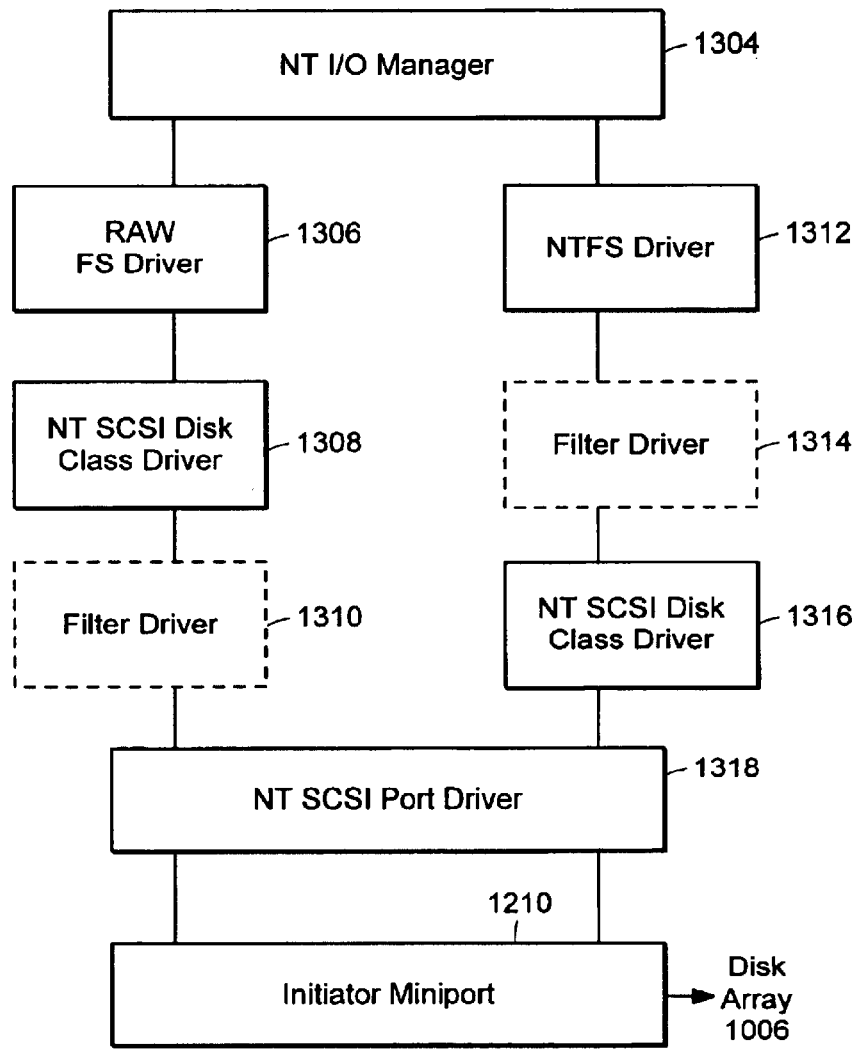
FIG. 13 is a block diagram showing a number of relevant components for disk configuration under the Windows NT operating system.

In a preferred embodiment of the present invention, each SP runs the Windows NT operating system. Within the Windows NT operating system, when a process makes a call to the Win32 Application Program Interface (API), the call is interpreted by a Windows NT Dynamically Linked Library (DLL) 1302, as shown in FIG. 13. For file or device operations, the DLL 1302 makes a system call, which is handled by the Windows NT Input/Output. (I/O) Manager 1304. If the operation is for a file on a file system, then the Windows NT I/O Manager 1304 calls a file system driver, which, in this case, is a NTFS Driver 1312. If the NTFS Driver 1312 needs to perform input/output operations, then the NTFS Driver 1312 makes a call to a disk class driver below it in the stack, which in this case is the Windows NT SCSI Disk Class Driver 1316. The call may be intercepted and processed by a Filter Driver 1314 before being processed by the Windows NT SCSI Disk Class Driver 1316. If an I/O operation is to a "raw" disk, then the Windows NT I/O Manager 1304 calls a RAW File System (FS) Driver 1306, which in turn calls the Windows NT SCSI Disk Class Driver 1308. The output from the Windows NT SCSI Disk Class Driver 1308 may be processed by a Filter Driver 1310. In either case, the Windows NT SCSI Port Driver 1318 is called to send SCSI commands to devices via the Initiator Miniport 1210.

Figure 14:
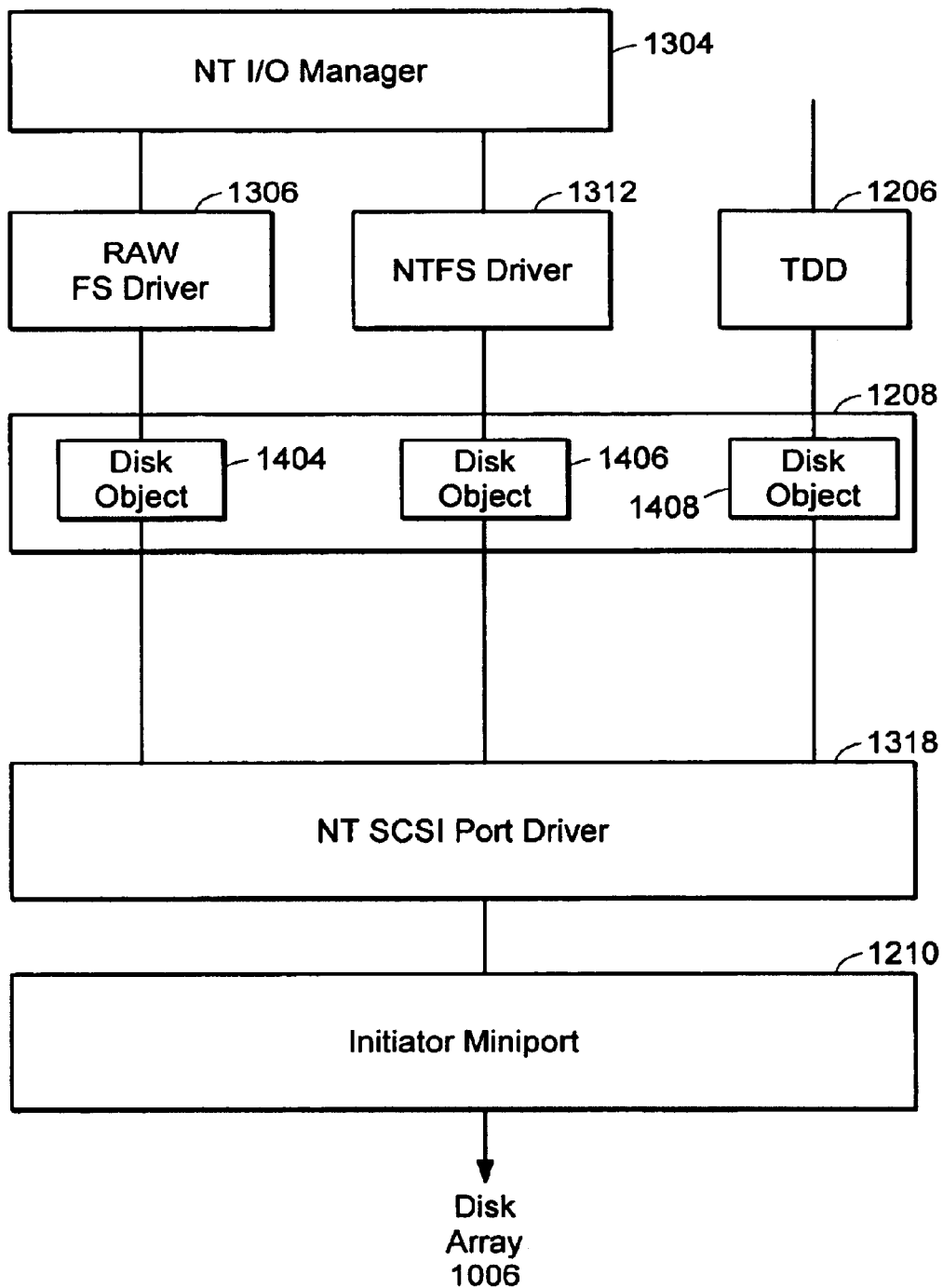
FIG. 14 is a block diagram showing a number of relevant disk-side components in accordance with an embodiment of the present invention.

The components on the Disk-Side 1123 present a standard Windows NT disk class interface and implement various fault tolerant disk strategies. These various fault tolerant disk strategies are performed by the Disk Management Software 1208. As shown in FIG. 14, the Disk Management Software 1208 includes a number of Disk Objects (1404, 1406, 1408) which are installed as filter drivers in the I/O stacks in order to intercept and process device operations.

Figure 15:
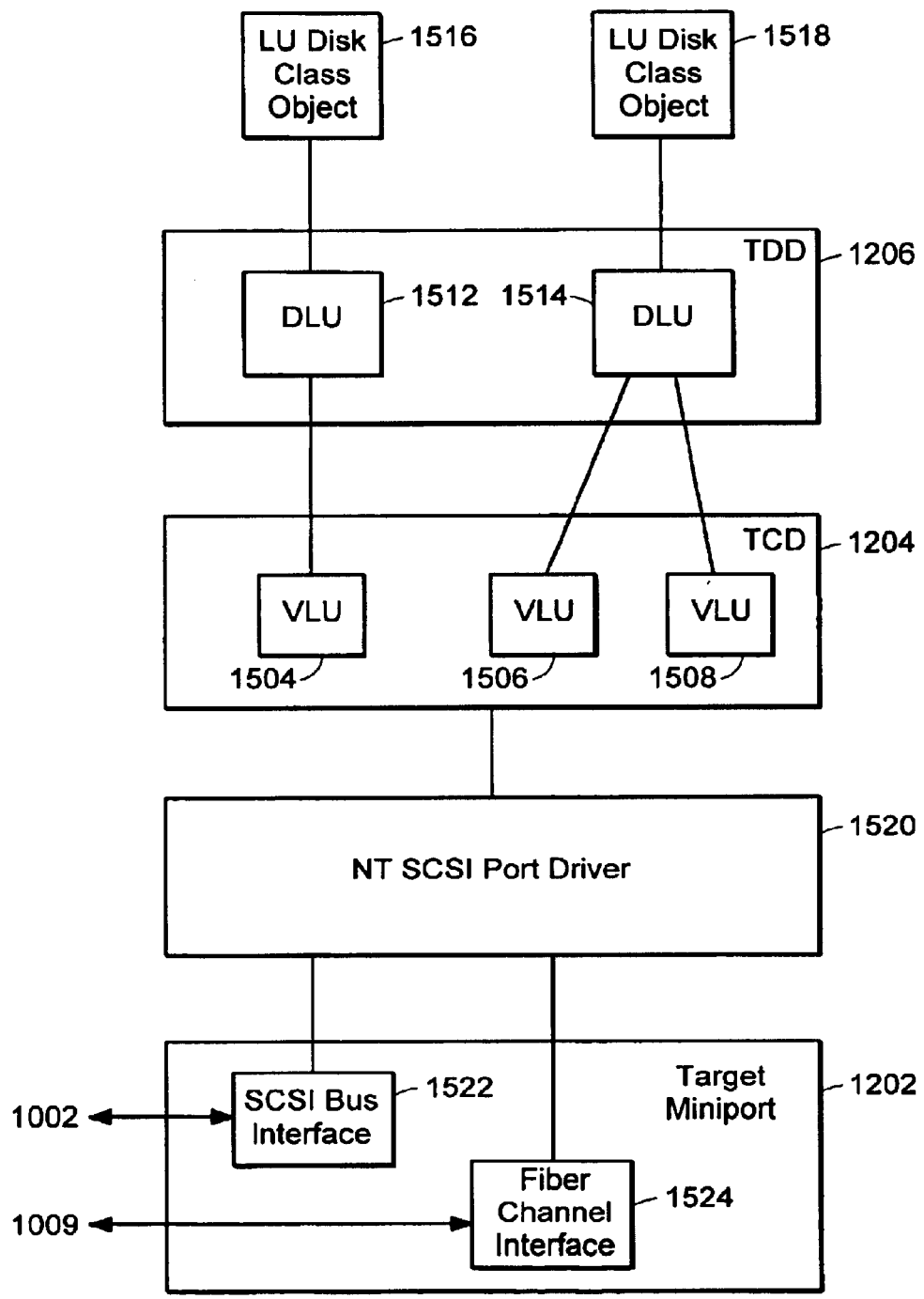
FIG. 15 is a block diagram showing a number of relevant host-side components in accordance with an embodiment of the present invention.

The Host-Side software 1121 contains a set of drivers that emulate a disk drive interface, making the storage unit appear to the Host 910 as an external disk drive. The Host 910 controls the storage unit through the Host-Side software 1121, although the actual storage is provided by a disk class object from the Disk-Side 1123. FIG. 15 shows the relationship between various Host-Side 1121 components. The Host 910 interfaces to the storage unit through the Target Miniport 1202, and specifically through a SCSI Bus Interface 1522 that is coupled to the Host Interface 1002. The SP interfaces to other SPs through the Target Miniport 1202, and specifically through a Fibre Channel Interface 1524 via the interface 1009. Information communicated to or from the Target Miniport 1202 is processed by the NT SCSI Port Driver 1520, which makes any necessary conversions to or from SCSI format. The NT SCSI Port Driver is coupled to the Target Class Driver (TCD) 1204, which essentially connects the Target Miniport 1202 to the actual storage and implements most of the basic SCSI protocols. The TCD 1204 creates a number of Virtual X Logical Unit (VLU) objects (1504, 1506, 1508), each representing a LU from the perspective of the Disk-Side software 1123. The Target Disk Driver (TDD) 1206 implements SCSI disk semantics. Its primary purpose is to implement Disk Logical Unit (DLU) objects (1512, 1514). Each DLU object (1512, 1514) sits on top of a disk class object (1516, 1518) presented by a lower level driver. The TDD 1206 examines all incoming commands and either services a particular command or delegates the command to the underlying disk class object.

The various components of the SP are administered through a standard administrative interface. Each component is associated with a component-specific administrative interface through which the component is configured and controlled. The component-specific administrative interface includes, among other things, a library of component-specific administrative interface functions for the component. The component-specific administrative interface is essentially a conversion layer between the standard administrative interface and the private interface of the component. For example, the component-specific administrative interface functions may convert data formats (for example, between "big-endian" and "little-endian" formats), configuration and control parameter formats, and error codes.

Each LU is associated with an Input/Output stack that includes a number of device drivers. In order to allow for customization at the I/O level for a particular LU, the SP software includes the LDD registration system that allows one or more LDDs to be inserted into the I/O stack of the LU. Each LDD emulates a device. A LDD "exports" a device to the LDD above it in the LU I/O stack, and is "bound" to the device from the LDD below it in the LU I/O stack in order to re-layer the device. A LDD may also "consume" a device.

More specifically, LDDs create, re-layer, and consume Windows NT devices. A LDD creates a device by making itself available to be linked into the LU I/O stack. Devices must be identified both across layer boundaries and within the context of layer boundaries. Thus, each device is identified by both a device name, which is unique only to each stage of re-layering, and a World Wide Name (WWN), which is unique across all stages of re-layering.

Figure 16:
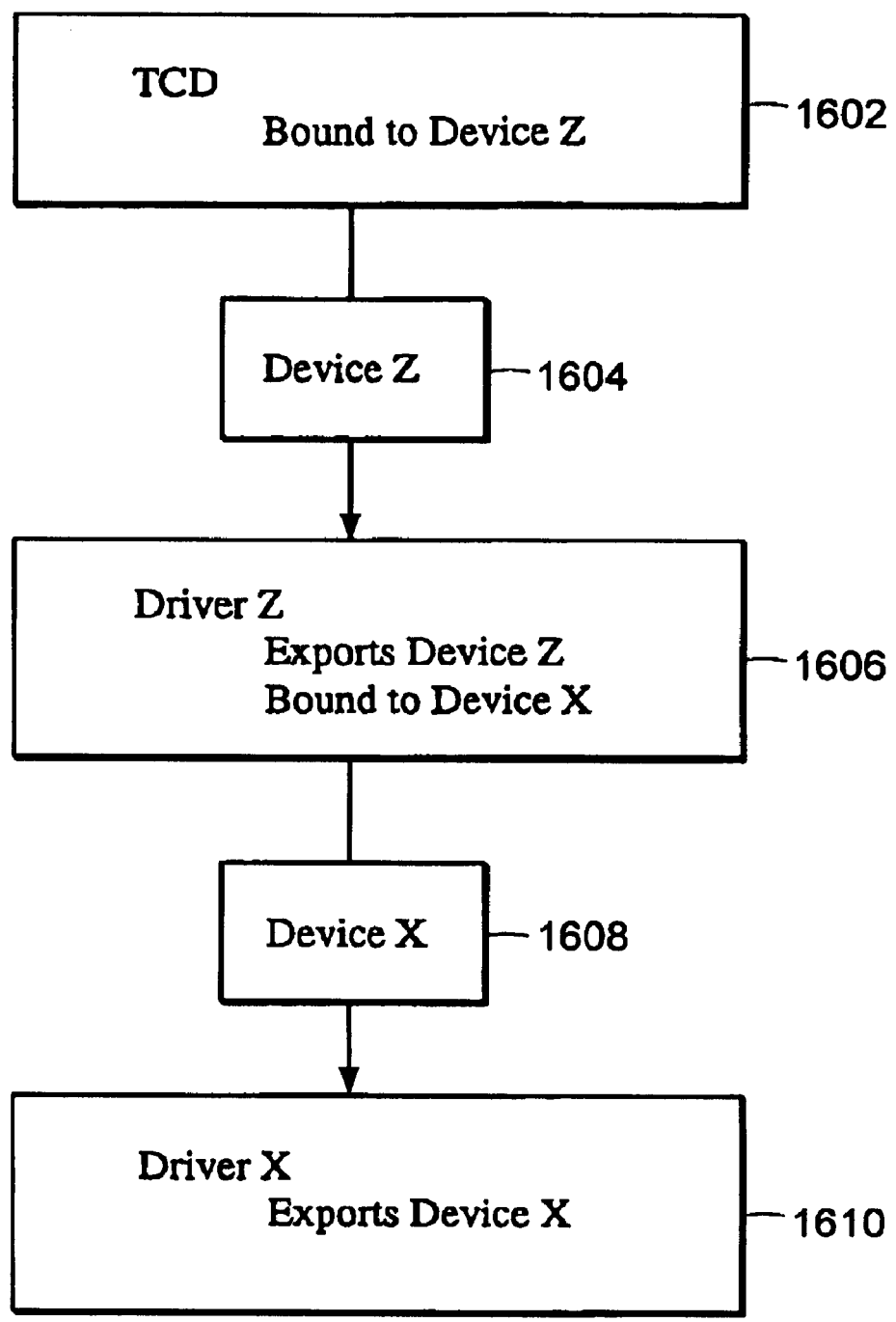
FIG. 16 is a block diagram showing a re-layered device driver in accordance with an embodiment of the present invention.

Once a device is created, the device is available to be re-layered. Re-layering of an existing device involves binding a LDD to the existing device and exporting it with a new device name. FIG. 16 shows a re-layered device in an exemplary LU I/O stack. Specifically, the LU I/O stack includes three layered device drivers, namely TCD (1602), Driver Z (1606), and Driver X (1610). Driver X (1610) creates Device X (1608). Driver Z (1606) binds to Device X (1608) and creates Device Z (1604), thereby re-layering Device X (1608). TCD (1602) binds to Device Z (1604) rather than Device X (1608). A device is typically re-layered by at most one LDD. The device may be re-layered by the creating LDD or by another LDD.

A LDD may also consume a device. Consumption is a term that is used to describe the allocation of storage resources to the LDD such that the storage resource are no longer available to other devices or to I/O from the host. The host designates a device to be consumed by the LDD via the LDD administrative interface.

It should be noted that a particular LDD, and therefore the corresponding layer of the LU I/O stack, may be "active" or "inactive." If the LDD is "active," then the LDD processes all I/O for the device. If the LDD is "inactive," then the LDD does not process any I/O for the device, and the LDD does not modify the I/O data in any way.

In order to manage the LDDs in the I/O stack, the LDD component includes its own LDD administrative interface. The LDD administrative interface includes a LDD administrative interface library including a number of LDD administrative interface functions. The LDD administrative interface functions provide for configuration and control of the LDD component, including, among other things, suspending and restarting I/O operations for a LU I/O stack, inserting a LDD into a LU I/O stack, removing a LDD from a LU I/O stack, and configuring LDD configuration parameters.

In order to utilize a particular device, the corresponding LDD is installed into an LU I/O stack using the LDD registration system in conjunction with the operating system device driver registration system. Installing the LDD into the LU I/O stack involves registering the LDD with both the LDD registration system and the operating system device driver registration system.

The Windows NT operating system maintains a list of device drivers and their corresponding parameters in the System\CurrentControlSet\Services file. The System\CurrentControlSet\Services file lists all device drivers in the system (that is, both layered device drivers belonging to LU I/O stacks and other device drivers), and can be very large. As a result, it can be difficult for a user or system administrator to determine from the System\CurrentControlSet\Services file which device drivers are the layered device drivers belonging to LU I/O stacks.

Using the information in the System\CurrentControlSet\Services file, the Windows NT operating system can load the device drivers into the operating system in a specified order. Such loading provides for orderly initialization of the device drivers. Unfortunately, the Windows NT operating system cannot set up the LU I/O stacks with proper layering order, as required for operation of LDDs in the preferred storage unit.

Therefore, the LDD registration system is used to set up the LU I/O stacks with proper layering order. The LDD registration system maintains a number of private files (i.e., separate from the operating system files) in order to keep track of the LDDs that are installed and the relationships between the LDDs. The LDD registration system enables a particular LDD to be inserted or removed from a LU I/O stack, and in particular from a specific layer in the LU I/O stack.

Specifically, the SP software maintains a Drivers list and a DriverOrder list under the Windows NT operating system. The Drivers list is used to identify the LDDs that are installed, and includes a DriverCount indicating the number of drivers in the list as well as a key for each driver. Each key includes an ordinal number, a driver name, a library name, a stack operations parameter, and an I/O initiator parameter. The DriverOrder file is used to specify the relative position of the LDDs with device driver stacks, and includes a DriverCount indicating the number of drivers in the list as well as a key for driver. Each key includes an ordinal number and a driver name.

In order to utilize a particular device, a new LDD is installed at the specified relative position in the LU I/O stack, specifically between an upper LDD and a lower LDD already in the LU I/O stack. Installing the new LDD into the LU I/O stack involves suspending I/O operations for the LU I/O stack, unbinding the upper LDD from the lower LDD, binding the new LDD to the lower LDD, binding the upper LDD to the new LDD, and restarting I/O operations for the LU I/O stack.

In order to stop using a particular device, the corresponding LDD may be removed from the LU I/O stack, specifically from between an upper LDD and a lower LDD already in the LU I/O stack. Removing the unwanted LDD from the LU I/O stack involves suspending I/O operations for the LU I/O stack, unbinding the upper LDD from the unwanted LDD, unbinding the unwanted LDD from the lower LDD, binding the upper LDD to the lower LDD, and restarting I/O operations for the LU I/O stack.

The administrator or network manager configures LU I/O stacks by invoking various administrative interface functions. The administrative interface functions provide for suspending and restarting I/O operations for an LU I/O stack, binding and unbinding drivers, and passing private management data to the LDD for the purpose of configuring the parameters for LDD operation. The administrative interface function for unbinding a driver includes a parameter for indicating whether or not the driver will be re-bound to another driver.

In order to insert a LDD into an LU I/O stack, the administrator or network manager invokes the appropriate administrative interface functions to suspend I/O operations for the LU I/O stack, unbind the upper LDD from the lower LDD (with an indication that the upper LDD will be re-bound), bind the upper LDD to the new LDD, bind the new LDD to the lower LDD, and restart I/O operations for the LU I/O stack.

In order to remove a LDD from the LU I/O stack, the administrator or network manager invokes the appropriate administrative interface functions to suspend I/O operations for the LU I/O stack, unbind the upper LDD from the unwanted LDD (with an indication that the upper LDD will be re-bound), unbind the unwanted LDD from the lower LDD (with an indication that e the unwanted LDD will not be re-bound), bind the upper LDD to the lower LDD, and restart I/O operations for the LU I/O stack.

In a preferred embodiment of the present invention, predominantly all of the layered driver administration logic is implemented as a set of computer program instructions that are stored in a computer readable medium and executed by an embedded microprocessor system within the storage processor. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a device, such as a computer, a storage unit, or a storage processor for operation in a storage unit, having an operating system device driver registration system and a layered device driver registration system. The layered device driver registration system enables a user to associate a device driver with one of a number of device driver stacks and to configure the relative position of the device driver within the device driver stack. The layered device driver registration system includes a driver file including a first key for the device driver, said first key including a driver name for the device driver and a library name indicating an administrative library for the device driver. The layered device driver registration system also includes a driver order file including a second key for the device driver, said second key including a driver name for the device driver and an ordinal value indicating the relative position of the device driver within the device driver stack.

The present invention may also be embodied as a method of utilizing a device driver in a computer storage device involving registering a device driver with an operating system device driver registration system and registering the device driver with a layered device driver registration system. Registering the device driver with the layered device driver registration system involves adding the device driver to a driver list and specifying a relative position for the device driver within a device driver stack. More specifically, adding the device driver to the driver list involves adding a first key to a driver file maintained by the layered device driver registration system, said first key including a driver name for the device driver and a library name indicating an administrative library for the device driver, while specifying the relative position for the device driver within a device driver stack involves adding a second key to a driver order file maintained by the layered device driver registration system, said second key including a driver name for the device driver and an ordinal value indicating the relative position of the device driver within the device driver stack.

The method also allows the device driver to be inserted at the specified relative position in the device driver stack. Specifically, inserting the device driver at the specified relative position in the device driver stack involves finding within the device driver stack an upper device driver above the specified relative position that is bound to a first device that is exported by a lower device driver below the specified relative position, suspending input/output operations for the device driver stack, unbinding the upper device driver from said first device, binding the device driver to said first device, binding the upper device driver to a second device that is exported by the device driver, and restarting input/output operations for the device driver stack.

The method also allows the device driver to be removed from the device driver stack. The device driver stack includes an upper device driver bound to a first device exported by the device driver and the device driver bound to a second device exported by a lower device driver. Removing the device driver from the stack involves suspending input/output operations for the device driver stack, unbinding the upper device driver from said first device, unbinding the device driver from said second device, binding the upper device driver to said second device, and restarting input/output operations for the device driver stack.

The present invention may be embodied in other specific forms without departing from the essence or essential characteristics. The described embodiments are to be considered in all respects only as illustrative and not restrictive.

We claim:

1. A method for dynamically adding a device driver into a layered stack of device drivers in a computer system comprising:

suspending I/O operations for the layered stack;

unbinding an upper driver in the stack from a lower driver in the stack, wherein the lower driver emulates a device, the device having a first device name;

binding the device driver to the lower driver to form a layered device, wherein upon forming the layered device, the layered device is given a second device name different than the first device name;

binding the upper driver to the layered device;

exporting the layered device under the second device name to the upper driver for use in the layered stack; and restarting I/O operations for the layered stack.

2. The method of claim 1, wherein the computer system is a computer storage system, and wherein the layered stack is a logical unit input/output stack.

3. A method for dynamically adding a device driver into a layered stack of device drivers in a computer system comprising:

suspending I/O operations for the layered stack;

unbinding an upper driver in the stack from a lower driver in the stack, wherein the lower driver emulates a device, the device having a first device name;

binding the device driver to the lower driver to form a layered device wherein upon forming the layered device, the layered device is given a second device name different than the first device name, wherein the first device name and the second device name are unique to a particular stage of re-layering;

binding the upper driver to the layered device; and restarting I/O operations for the layered stack.

4. The method of claim 3, wherein the computer system is a computer storage system, and wherein the layered stack is a logical unit input/output stack.

5. A method for dynamically adding a device driver into a layered stack of device drivers in a computer system comprising:

suspending I/O operations for the layered stack;

unbinding an upper driver in the stack from a lower driver in the stack, wherein the lower driver emulates a device, the device having a first device name;

binding the device driver to the lower driver to form a layered device wherein upon forming the layered device, the layered device is given a second device name different than the first device name, wherein the first device name and the second device name are unique across all stages of re-layering;

binding the upper driver to the layered device; and restarting I/O operations for the layered stack.

6. The method of claim 5, wherein the computer system is a computer storage system, and wherein the layered stack is a logical unit input/output stack.

7. A method for dynamically adding a device driver into a layered stack of device drivers in a computer system having an operating system and a layered device driver registration system, wherein the layered device driver registration system comprises a driver list and a driver order file, said method comprising:

registering the device driver with the operating system;

registering the device driver with the layered device driver registration system by adding the device driver to the driver list, and specifying in the driver order file a relative position for the device driver within the layered stack;

suspending I/O operations for the layered stack;

unbinding an upper driver in the stack from a lower driver in the stack;

binding the device driver to the lower driver to form a layered device;

binding the upper driver to the layered device; and restarting I/O operations for the layered stack.

8. The method of claim 7, wherein adding the device driver to the driver list comprises adding a first key to a driver file maintained by the layered device driver registration system, said first key including a driver name for the device driver and a library name indicating an administrative library for the device driver, and wherein specifying the relative position for the device driver within the layered stack comprises adding a second key to a driver order file maintained by the layered device driver registration system, said second key including a driver name for the device driver and an ordinal value indicating the relative position of the device driver within the layered stack.

9. The method of claim 7, wherein the computer system is a computer storage system, and wherein the layered stack is a logical unit input/output stack.

* * * * *